(12) United States Patent
Elliot et al.

(10) Patent No.: US 8,798,403 B2
(45) Date of Patent: Aug. 5, 2014

(54) SYSTEM AND METHOD FOR CAPTURING PRODUCTION WORKFLOW INFORMATION

(75) Inventors: Jack Gaynor Elliot, Penfield, NY (US); Sharath Srinivas, Webster, NY (US); Eric Michael Gross, Rochester, NY (US); Sudhendu Rai, Fairport, NY (US); Marc Dennis Daniels, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 214 days.

(21) Appl. No.: 13/362,694

(22) Filed: Jan. 31, 2012

(65) Prior Publication Data

US 2013/0195381 A1 Aug. 1, 2013

(51) Int. Cl.
G06K 9/22 (2006.01)

(52) U.S. Cl.
USPC ........................................... 382/314

(58) Field of Classification Search
USPC ............... 345/179; 346/136 C; 358/424, 478; 369/142, 173; 382/314; 705/7.27, 301; 707/608; D14/411, 431
See application file for complete search history.

(56) References Cited

U.S. PATENT DOCUMENTS

| 5,459,826 A * | 10/1995 | Archibald | 715/209 |
|---|---|---|---|
| 7,203,383 B2 * | 4/2007 | Fisher | 382/314 |
| 7,242,302 B2 | 7/2007 | Rai et al. | |
| 7,580,911 B2 | 8/2009 | Sun et al. | |
| 2002/0156816 A1 * | 10/2002 | Kantrowitz et al. | 707/530 |
| 2004/0002926 A1 | 1/2004 | Coffy et al. | |
| 2004/0064787 A1 | 4/2004 | Braun et al. | |
| 2004/0093568 A1 * | 5/2004 | Lerner et al. | 715/541 |
| 2005/0174595 A1 * | 8/2005 | Walpus et al. | 358/1.14 |
| 2006/0087497 A1 | 4/2006 | Borgaonkar et al. | |
| 2006/0097997 A1 | 5/2006 | Borgaonkar et al. | |
| 2006/0182343 A1 | 8/2006 | Lin et al. | |
| 2007/0008304 A1 | 1/2007 | Tobin | |
| 2007/0025645 A1 | 2/2007 | Slatter | |
| 2007/0126716 A1 | 6/2007 | Haverly | |
| 2008/0120129 A1 * | 5/2008 | Seubert et al. | 705/1 |
| 2008/0121441 A1 | 5/2008 | Sheets et al. | |
| 2008/0208007 A1 | 8/2008 | Van Hove et al. | |
| 2008/0209508 A1 | 8/2008 | Albarran Moyo et al. | |
| 2008/0273797 A1 | 11/2008 | Takikawa et al. | |
| 2009/0019360 A1 | 1/2009 | Lynggaard et al. | |
| 2010/0238195 A1 | 9/2010 | McGee et al. | |
| 2012/0189999 A1 * | 7/2012 | Uthman et al. | 434/335 |
| 2012/0282587 A1 | 11/2012 | Lofthus et al. | |

* cited by examiner

Primary Examiner — Gregory F Cunningham
(74) Attorney, Agent, or Firm — Fox Rothschild LLP

(57) ABSTRACT

A workflow information capture system uses a digital pen to capture handwritten information about a production process resource. The pen captures the handwritten markings from a worksheet, identifies the position of the marking, based on the position determines one or more process parameters for the marking, and saves the handwritten markings and their corresponding process parameter in a memory. The system may then use this information to generate recommendations for improving a workflow that is implemented by the process resource.

20 Claims, 7 Drawing Sheets

700

| Request No. | Activity |
|---|---|
|  | Equip: ① ② ③ ④ ⑤ ⑥ ⑦ ⑧ ⑨ ⑩ ⑪ ⑫ ⑬ ⑭ ⑮ ⑯ ⑰ ⑱ ⑲ ⑳ N/A☐<br>Accept☐   Preflight☐   BW_prn☐   Color_prn☐   Poster_prn☐   Fold☐   Score☐<br>Laminate☐   Stuff☐   Label☐   Fold☐   Insert☐   Punch☐   Bind☐   Pack☐   Ship☐<br>Start Date _____ Time _____ am☐ pm☐ Stop Date _____ Time _____ am☐ pm☐ |
|  | Equip: ① ② ③ ④ ⑤ ⑥ ⑦ ⑧ ⑨ ⑩ ⑪ ⑫ ⑬ ⑭ ⑮ ⑯ ⑰ ⑱ ⑲ ⑳ N/A☐<br>Accept☐   Preflight☐   BW_prn☐   Color_prn☐   Poster_prn☐   Fold☐   Score☐<br>Laminate☐   Stuff☐   Label☐   Fold☐   Insert☐   Punch☐   Bind☐   Pack☐   Ship☐<br>Start Date _____ Time _____ am☐ pm☐ Stop Date _____ Time _____ am☐ pm☐ |
|  | Equip: ① ② ③ ④ ⑤ ⑥ ⑦ ⑧ ⑨ ⑩ ⑪ ⑫ ⑬ ⑭ ⑮ ⑯ ⑰ ⑱ ⑲ ⑳ N/A☐<br>Accept☐   Preflight☐   BW_prn☐   Color_prn☐   Poster_prn☐   Fold☐   Score☐<br>Laminate☐   Stuff☐   Label☐   Fold☐   Insert☐   Punch☐   Bind☐   Pack☐   Ship☐<br>Start Date _____ Time _____ am☐ pm☐ Stop Date _____ Time _____ am☐ pm☐ |
|  | Equip: ① ② ③ ④ ⑤ ⑥ ⑦ ⑧ ⑨ ⑩ ⑪ ⑫ ⑬ ⑭ ⑮ ⑯ ⑰ ⑱ ⑲ ⑳ N/A☐<br>Accept☐   Preflight☐   BW_prn☐   Color_prn☐   Poster_prn☐   Fold☐   Score☐<br>Laminate☐   Stuff☐   Label☐   Fold☐   Insert☐   Punch☐   Bind☐   Pack☐   Ship☐<br>Start Date _____ Time _____ am☐ pm☐ Stop Date _____ Time _____ am☐ pm☐ |
|  | Equip: ① ② ③ ④ ⑤ ⑥ ⑦ ⑧ ⑨ ⑩ ⑪ ⑫ ⑬ ⑭ ⑮ ⑯ ⑰ ⑱ ⑲ ⑳ N/A☐<br>Accept☐   Preflight☐   BW_prn☐   Color_prn☐   Poster_prn☐   Fold☐   Score☐<br>Laminate☐   Stuff☐   Label☐   Fold☐   Insert☐   Punch☐   Bind☐   Pack☐   Ship☐<br>Start Date _____ Time _____ am☐ pm☐ Stop Date _____ Time _____ am☐ pm☐ |
|  | Equip: ① ② ③ ④ ⑤ ⑥ ⑦ ⑧ ⑨ ⑩ ⑪ ⑫ ⑬ ⑭ ⑮ ⑯ ⑰ ⑱ ⑲ ⑳ N/A☐<br>Accept☐   Preflight☐   BW_prn☐   Color_prn☐   Poster_prn☐   Fold☐   Score☐<br>Laminate☐   Stuff☐   Label☐   Fold☐   Insert☐   Punch☐   Bind☐   Pack☐   Ship☐<br>Start Date _____ Time _____ am☐ pm☐ Stop Date _____ Time _____ am☐ pm☐ |

FIG. 7

SYSTEM AND METHOD FOR CAPTURING PRODUCTION WORKFLOW INFORMATION

BACKGROUND

In any manufacturing or production process, data collection is important to ensure proper and efficient process operation. For example, in a document production environment (such as a print shop), operators must monitor workflow information about each job that is being printed. The information is collected and analyzed to identify and address any issues that may have arisen during the production, as well as to identify areas for potential improvement.

Many production environments still use manual data collection methods for collecting workflow related information. Although many production environments have managed information systems that can automatically capture shop floor data, the data from these systems is not always accessible, it requires expensive monitoring equipment, and it does not allow for manual observations and judgments to be captured in an effective manner. As a result, manual recordkeeping is still a common form of data collection in a shop floor environment. Unfortunately, manual entries are often difficult to interpret, error prone, and require additional time to convert into a digital format for electronic storage. Often, the data is not viewed and analyzed until weeks after it has been collected and, therefore, entry and process errors are not identified in a timely manner.

This document describes methods and systems that are directed to solving at least some of the problems described above.

SUMMARY

In an embodiment, a workflow information capture system includes a worksheet on which input fields and position-identifying indicia are printed. The system also includes a digital pen that has an image-capturing sensor and program instructions that instruct the pen to capture handwritten markings that are present on the worksheet. The image capturing sensor detects at least a portion of the position-identifying indicia. At least some of the captured position-identifying indicia will correspond to a location of at least one of the handwritten markings on the substrate. The system also includes a computing device having a processor, a memory, and instructions that instruct the processor to: (i) receive the handwritten markings and the captured position-identifying indicia from the digital pen; (ii) identify, based on the position-identifying indicia, a set of process parameters, (iii) identify, for each of the markings based on the position-identifying indicia, an input position; (iv) for each input position, determine which of the process parameters correspond to the input position; and (v) for each handwritten marking, save the handwritten marking and its corresponding process parameter in the memory.

Optionally, the digital pen may include a timing circuit, and the pen's program instructions may instruct the pen to identify a time stamp for each detected marking. The time stamps may be saved in a worksheet file in association with the time stamp's corresponding marking.

Optionally, the pen's program instructions also instruct the pen to select a detected marking, identify a set of acceptable responses based on the selected marking's position-identifying indicia, compare the selected marking to the set of acceptable responses, determine that the selected marking does not match any of the acceptable responses in the set, and provide the user with a prompt to correct the selected marking. The acceptable responses may be time-dependent acceptable responses, in some embodiments.

In some embodiments, the system may include a document production resource. If so, at least a portion of the handwritten markings may be made in input fields to correspond to workflow data, wherein the workflow data is for the document production resource or for a print job that is processed by the document production resource.

In some embodiments, the memory also has instructions that instruct the processor to analyze data corresponding to the handwritten markings and process parameters and provide a recommendation to alter a process workflow. For example, the system may analyze data corresponding to the handwritten markings and process parameters to identify a utilization measure for the document production resource, determine that the utilization measure is at or below a threshold, and provide a recommendation to alter a process workflow for the document production resource.

In an alternate embodiment, a system for capturing process workflow information includes a computing device having a processor, a memory and a graphical user interface, the memory having program instructions that instruct the processor to: (i) receive, from a user, process workflow information that includes an identifier corresponding to a production process resource and at least one observable process parameter for the resource; (ii) generate a template file comprising the process workflow information and position-identifying data; and (iii) print a worksheet on a substrate based on the template file, wherein the worksheet includes the position-identifying data and one or more input fields. The system also includes a digital pen comprising an image-capturing sensor and an ink tip, wherein the digital pen includes program instructions that instruct the pen to: (i) detect handwritten markings on the substrate, wherein the markings comprise ink from the ink tip; and (ii) detect, via the image-capturing sensor, at least a portion of the position-identifying data, wherein each item of detected position-identifying data corresponds to a location of one of the handwritten markings on the substrate.

In other embodiments, a method for capturing process workflow information uses a computing device to receive, from a user, process workflow information that includes an identifier corresponding to a document production resource and at least one observable process parameter for the resource. The method also may include generating a template file comprising the process workflow information and position-identifying data, and printing a worksheet on a substrate based on the template file. The worksheet will include the position-identifying data and one or more input fields that correspond to one or more categories of workflow information for the document production resource. The method may include receiving, from a digital pen, a set of captured handwritten markings and position-identifying data that the digital pen detected on the worksheet. Each item of detected position-identifying data may correspond to a location of one of the handwritten markings on the worksheet. The method may include identifying an input location that corresponds to each of the captured markings, where each input location being that for which the applicable input field has a physical position that corresponds to the position-identifying data. The method may include identifying a process parameter that corresponds to each applicable input field, and storing, in a worksheet file in association with each applicable input field, the field's identified process parameter.

In some embodiments, the method also may include selecting a detected handwritten marking, and based on the selected marking's position-identifying data identifying a set of acceptable responses. The method also may include comparing the selected marking to the set of acceptable responses, determining that the selected marking does not match any of the acceptable responses in the set, and causing the digital pen to prompt a user to correct the selected marking. The method also may include analyzing data corresponding to the handwritten markings and process parameters, and generating a recommendation to alter a process workflow for the document production resource.

BRIEF DESCRIPTION OF THE DRAWINGS

FIG. 7 illustrates an example of a workflow information capture form.

DETAILED DESCRIPTION

Figure 1:
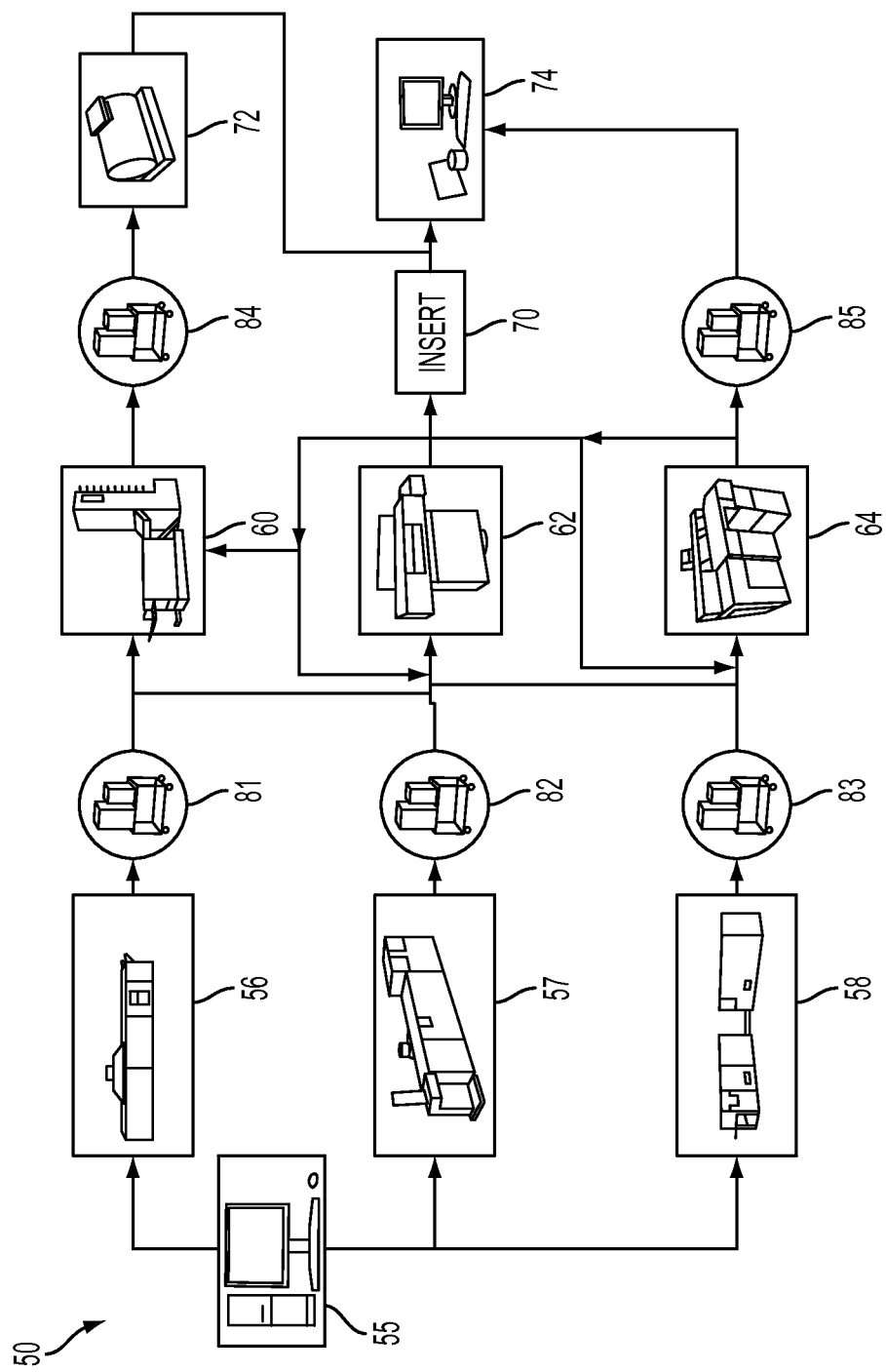
FIG. 1 is a graphic representation of possible elements of a print shop.

This disclosure is not limited to the particular systems, devices and methods described, as these may vary. Also, the terminology used in this document is only for the purpose of describing particular versions or embodiments, and it is not intended to limit the scope. As used in the description below and in the appended claims, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to." As used herein, the terms "sum," "product" and similar mathematical terms are construed broadly to include any method or algorithm in which a single datum is derived or calculated from a plurality of input data.

Nothing in this document is to be construed as an admission that the embodiments described in this document are not entitled to antedate such disclosure by virtue of prior invention.

As used in this document, a statement that a device or system is "in electronic communication with" another device or system means that devices or systems are configured to send data, commands and/or queries to each other via a communications network. The network may be a wired or wireless network such as a local area network, a wide area network, an intranet, the Internet or another network.

A "computing device" refers to a computer, a processor and/or any other component, device or system that performs one or more operations according to one or more programming instructions.

A "digital pen" refers to an input device that is capable of both writing on a substrate and capturing data corresponding to the user's handwriting or strokes.

A "job" refers to a logical unit of work that is to be completed for a customer. In a document production environment, a job may include one or more print jobs from one or more clients. For example, a print shop order may be a request from a customer to print, collate, and cut, staple and/or bind a set of documents. A job may include one or more print jobs from one or more clients. As another example, a print job may include producing credit card statements corresponding to a certain credit card company, producing bank statements corresponding to a certain bank, printing a document, producing credit cards, or the like. Although the disclosed embodiments pertain to print jobs, the disclosed methods and systems can be applied to jobs in general in other production environments, such as automotive parts manufacturing, food packaging and the like.

A "print shop" refers to an entity that includes multiple document production resources, such as printers, cutters, collators and the like. A print shop is an example of a document production environment. A print shop may be a freestanding entity including one or more print-related devices such as a printing service provider, or it may be a document production group within a corporation or other entity. Additionally, a print shop may communicate with one or more servers by way of a local area network or a wide area network, such as the Internet, the World Wide Web or the like.

FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Figure 2:
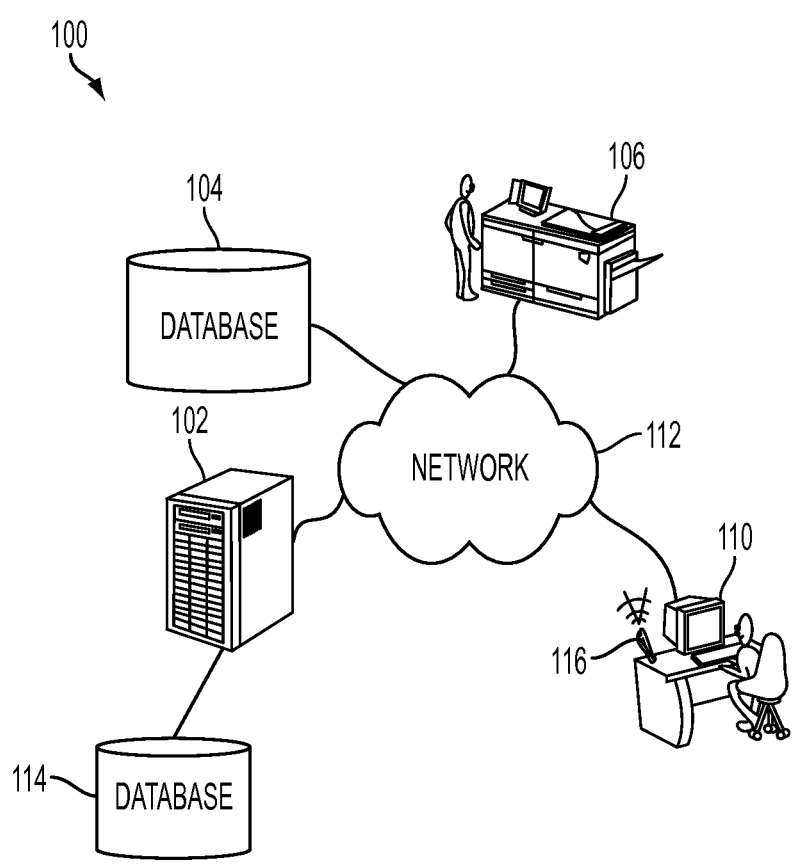
FIG. 2 shows possible elements of a production workflow information capture system.

FIG. 2 shows elements of a production workflow information capture system 100. Workflow information capture system 100 includes a server 102, one or more data storage facilities 104, 114, or more printing devices 106 that together form a print shop, and one or more workstations 110. The system also may include one or more optical information collection devices such as a digital pen 116 that also contains an optical input device, such as a camera, that is capable of capturing images. An exemplary digital pen is disclosed in U.S. Pat. No. 6,208,771, the disclosure of which is incorporated herein by reference in its entirety. The digital pen may include a wireless or wired transceiver that enables it to engage in data communication with a workstation 110, and/or with other devices in the system.

Each of the components of workflow information capture system 100 is in data communication with at least one of the other components, either directly (such as via a direct cable connection) or through via one or more networks 112. For example, as shown in FIG. 2, a data storage facility 104 may communicate with the server via the network. Alternatively, a data storage facility may communicate directly with the server 102 as illustrated by exemplary data storage facility 114. In the latter situation, the server 102 may relay information from the data storage facility 114 out through the network 112, and the server 102 may receive information via the network 112 and relay the information to the data storage facility 114 for storage.

The server 102 is an electronic processing device that implements computer-readable program instructions and delivers data to other devices that are connected to the server, either directly or indirectly over a network. The server 102 may include a web server, a server, a minicomputer, a mainframe computer, a personal computer, a mobile computing device, or other such device.

The data storage facility 104 is a collection of one or more electronic devices having tangible computer-readable memory that stores data in a structured format, such as one or more databases, tables, or other computer-readable files. The printing device 106 is an electronic device that is capable of performing an action to produce a document in a print shop. For example, some of the printing devices may print text and/or graphics on a substrate such as paper. Others may bind, collate, sort, staple, finish, or otherwise process a document.

The network 112 may be the Internet, an intranet, an ethernet, a local area network, a wide area network, a cellular phone network, or other means for providing data communication between a plurality of digital devices. Some of the data communication between any of the components of the workflow information capture system 100 may be via a direct connection which may be wired or wireless. In the examples described below, the network 112 is the Internet.

Figure 3:
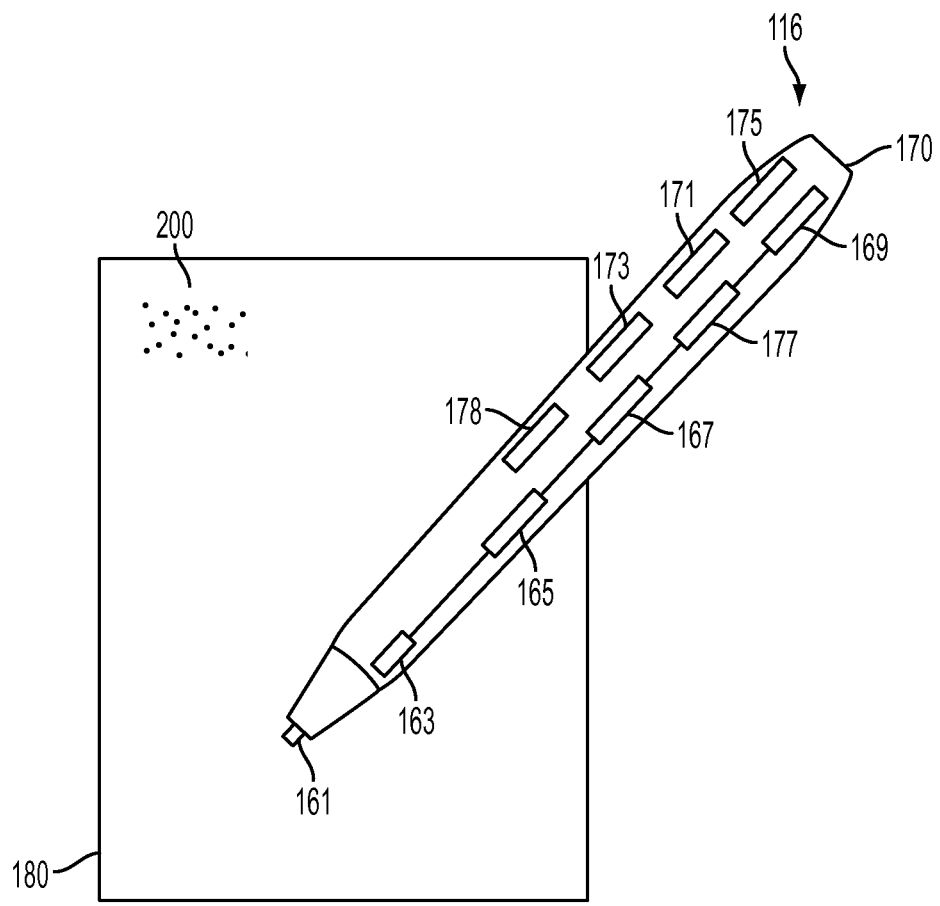
FIG. 3 illustrates components of an example of a digital pen and substrate.

FIG. 3 illustrates various elements of a digital pen 116. A pen-shaped housing 170 contains an image sensor 163 such as a camera or infrared sensor, a processor 165, a memory device 167, a transmitter 169 and/or a communications port 175. In some embodiments, the pen may include a display 171 and an audio output 173. The display may be an organic light-emitting diode (OLED) display, a sequence of lights, or any other display mechanism. The audio output may be a speaker and/or a port to which an external device such as headphones may be attached. An ink tip 161 extends from an end of the housing 170 and may be used to apply markings on a substrate 180 such as paper. Optionally, the pen may include a timing circuit 177 such as a clock circuit or an interface to an external clock. In some embodiments, the timing circuit 177 may be an independent circuit, programming or another means that enables the pen to track an elapsed time. The pen also may include a position sensor 178 such as an accelerometer or gyroscope.

The substrate 180 also may include an embedded position-identifying pattern 200. The position-identifying pattern 200 will be digitally-readable indicia, such as a pattern or series of codes that uniquely identifies the document and various locations on the document. In situations where the substrates are used for information collection forms, each form (or each type of form) may contain unique elements, and the pattern will vary throughout different locations on each worksheet. For example, the indicia that is printed on an area corresponding to an information capture sheet's first data entry field will be different from that printed on the area corresponding to a different data entry field.

The embedded pattern may be any printable or printed, machine-readable indicia that may be used to provide data to identify a document and a location on the document. For example, the data may take the form of a unique, skewed dot matrix pattern such as that described above. Instead of a pure matrix pattern, in which under typical circumstances each dot is printed at the point where the horizontal and vertical guide lines of the matrix intersect, each dot would be slightly set-off or "skewed" from its intersection. Such dot matrix patterns may be generated using technologies such as those available from Anoto, Inc. A digital pen such as those available from Livescribe, Inc. may be used to read the pattern. The digital pen can see these dots with its sensor, and use the dots to identify the substrate and the location of the pen on the substrate. Alternatively, the embedded data may include a series of glyph codes or other codes, such as glyph codes that are generated using the process of U.S. Pat. No. 6,208,771, the disclosure of which is incorporated herein by reference in its entirety.

Figure 4:
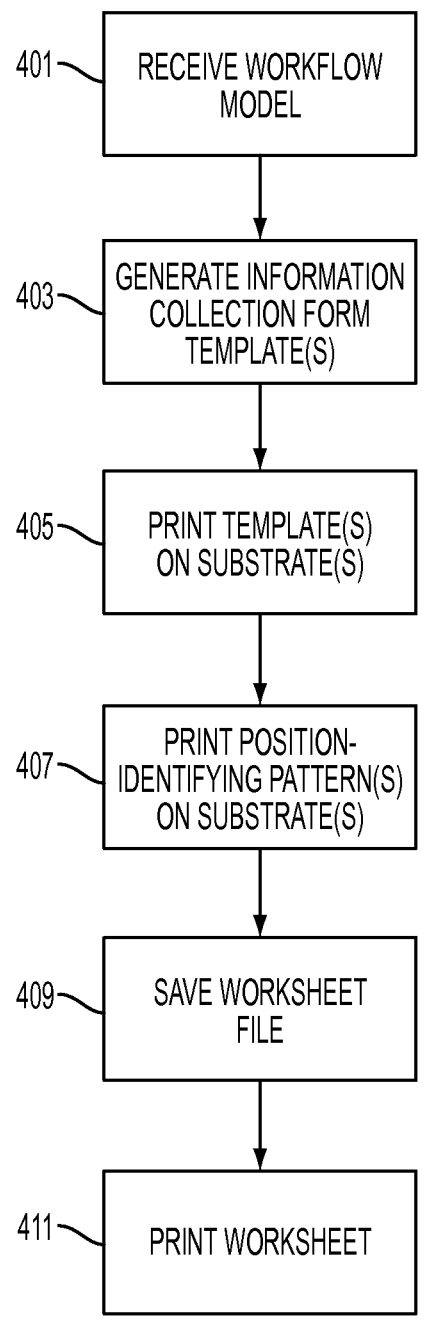
FIG. 4 is a flowchart that illustrates several possible steps in a method of creating a workflow information capture form.

FIG. 4 illustrates a method by which production data facility collection forms may be created. Referring to FIG. 4, the system may receive a process workflow model for a production facility 401. The model may be, for example, a representation of production process resources (which is either equipment such as print devices in a print shop, or a human operator of the equipment) with one or more parameters to be monitored for each production process resource. The system may then generate one or more production facility data collection form templates 403. Each template includes input fields on which a shop operator may enter process parameters that he or she monitors while in the facility. The system may generate one template to be used throughout the facility, or it may generate multiple templates to be used for individual items of equipment, groups of equipment, or areas within the facility.

The templates may be used to print information collection sheets on paper or other substrates 405. The template may be printed with a unique set of embedded data that yields a unique pattern configured to be read by an optical collection device 407. The embedded data identifies physical positions of various locations on the substrate. The template, optionally with the embedded data, may be saved to a computer-readable memory as a worksheet file 409 so that the production workflow collection form may be printed 411 at a subsequent time.

Figure 5:
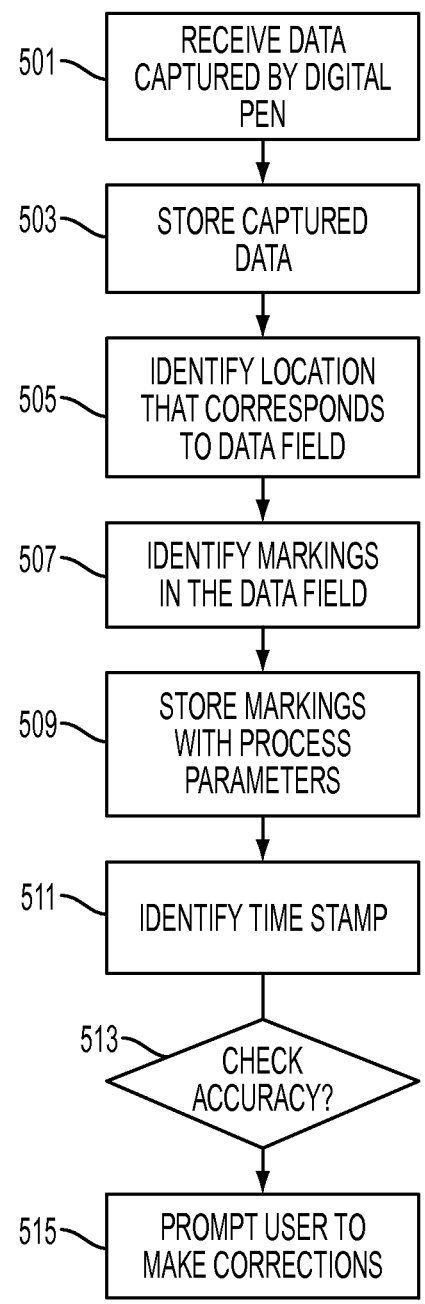
FIG. 5 is a flowchart that illustrates several possible steps in a method of capturing production workflow information.

FIG. 5 illustrates a method by which production data facility collection forms may be used. A processor may receive captured data from an optical collection sensor, and optionally also a position sensor, of a digital pen 501. An equipment operator or other user may use the pen to make handwritten markings on a substrate, which in this case is a data collection form. The processor may receive the data via a transmission from the pen's transmitter, or the device may be connected to the processor's computing device for transfer through a port such as a USB port. Alternatively, the processor of the pen itself may receive the data and save it to the pen's memory. The captured data will include at least some of the handwritten markings that a user of the pen makes on a substrate, along with at least some of the embedded position-identifying pattern data for the worksheet. The position identifying pattern will be captured by the pen's optical sensor. The handwritten markings also may be captured by the pen's optical sensor, or by a position sensor (such as an accelerometer) that detects strokes of the pen.

The captured data may be saved as a worksheet file 503. A processor may then access the worksheet file, and use the embedded position-identifying pattern information to identify a location 505 that corresponds to a data field. This processor may be the same one as the one that creates the worksheet file, or it may be a different processor. The processor will then identify the markings that the pen's sensor read in that input field 507, identify which of the process parameters corresponds to the applicable input field, and store the captured data in association with the corresponding process parameter 509 in a data file or database.

Optionally, some data may be entered automatically, without manual input. For example, the digital pen's clock may be used to automatically identify a time stamp 511 corresponding to the time that the operator is using the form to enter data. This data may then be used to check accuracy 513 of data entered. If the data does not correspond to the time stamp, for example if the operator name or job ID does not match that of an operator or job that was scheduled at the time, the user may be issued a prompt 515 via the digital pen's display or audio output. The prompt may prompt the user to check or verify accuracy of the data.

Figure 6:
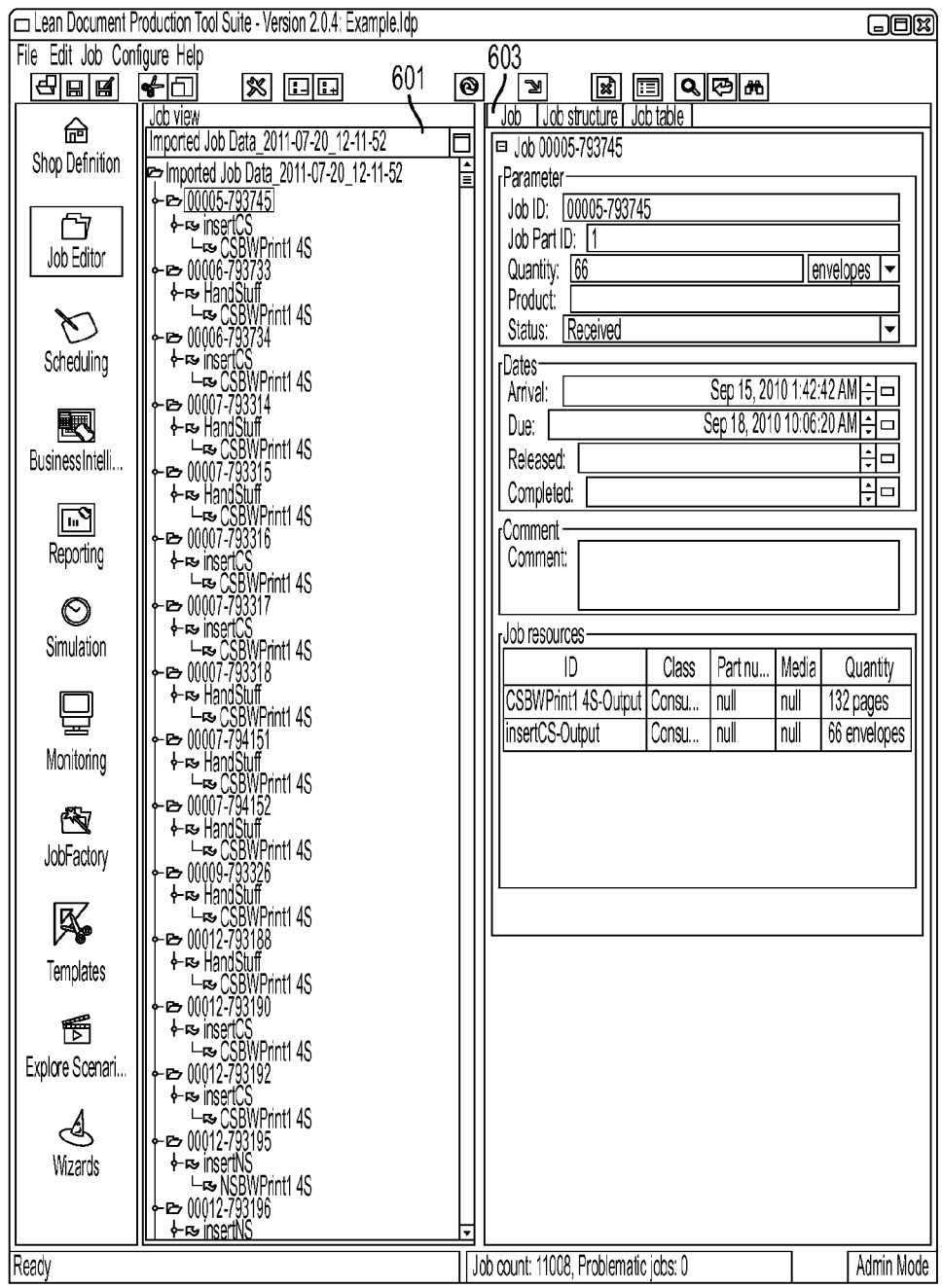
FIG. 6 illustrates a user interface that a user may use to create the workflow model for the production environment.

FIG. 6 illustrates an example of an interface that a user may use to create the workflow model for the production environment. The user interface may include a field where the user can enter a resource identifier such as an equipment ID or an operator name. For example, when creating a print shop workflow model the user may select a printer, a collator, or a group of equipment and related services such as a mailroom. Alternatively, the user interface may include a job identification field 601 where the user can select a job for which the workflow model may be created. Each identifier may be used to create a form for its associated equipment, or one form may cover multiple jobs or resources. The user may then select or create one or more input fields 603 for each job or resource set, such as (i) operator name; (ii) equipment ID; (iii) job ID; (iv) job subpart ID; (v) job size; (vi) start time or stop time; (vii) status, (viii) shift; or (ix) other fields. Optionally, some of the fields may be pre-populated with text so that the user only needs to make a mark (such as an "x" or a check) in a box or other area near the text to indicate that the text is applicable.

The workflow model is used to create a data collection form template that may be saved in a worksheet file. When the file is accessed, as shown in FIG. 7 a processor may cause the form 700 to be printed on a substrate with embedded position-identifying information.

To capture the current state of a shop, a shop employee will use a digital pen to input data on an appropriate intelligent form (created as described above). The data fields will guide the operator as to what data to enter. The data may include information such as operator name, machine name, job ID, job size, start time, stop time, etc., for one or more jobs at a station or piece of equipment. Optionally, as the user enters data on the form, the speaker and/or display of the digital pen can also be used to provide the user with feedback, such as by repeating text that the pen recognizes that the user has written on the worksheet with the digital pen, or by speaking text that corresponds to a data field that the user has selected. This may allow the user to correct or otherwise change entries in real-time if desired.

Optionally, some data may be entered automatically, without manual input. For example, the digital pen's clock may be used to automatically identify data corresponding to the time that the operator is using the form to enter data.

The data stored on a digital pen may be transferred to a computing device. The transfer may be done automatically, via a remote transmitter. Or, the data may be transferred via a communications port, such as a USB port. A software application may then analyze the data to provide recommendations and/or reports of the system's current state or to design a new workflow and simulate performance. For example, data relating to utilization of a particular item of equipment may be compared to a threshold (such as 35% or another value), and the system may recommend a change or provide an alert if the device's utilization is below the threshold. In addition, the data may be imported into a tool suite with a user interface that a user can use to see data results collected from multiple data collection forms.

Some or all of the above-disclosed and other features and functions, or alternatives thereof, may be desirably combined into many other different systems or applications. Various presently unforeseen or unanticipated alternatives, modifications, variations or improvements therein may be subsequently made by those skilled in the art, each of which are also intended to be encompassed by the disclosed embodiments.

The invention claimed is:

1. A workflow information capture system, comprising:
a worksheet having a plurality of input fields and position-identifying data printed thereon;
a digital pen comprising an image-capturing sensor, wherein the digital pen includes program instructions that instruct the pen to:
capture a plurality of handwritten markings that are present on the worksheet, and
detect, via the image capturing sensor, at least a portion of the position-identifying data, wherein at least some of the captured position-identifying data corresponds to a location of one of the handwritten markings on the substrate; and
a computing device having a processor and a memory, wherein the memory has instructions that instruct the processor to:
receive the handwritten markings and the captured position-identifying data from the digital pen,
identify, based on the position-identifying data, a set of process parameters,
identify, for each of the markings based on the position-identifying data, an input position,
for each input position, determine which of the process parameters correspond to the input position, and
for each handwritten marking, save the handwritten marking and its corresponding process parameter in the memory.

2. The system of claim 1, wherein the digital pen further comprises a timing circuit, and the pen's program instructions also instruct the pen to:
identify, for each detected marking, a time stamp; and
save each of the time stamps in a worksheet file in association with the time stamp's corresponding marking.

3. The system of claim 1, wherein the pen's program instructions also instruct the pen to:
select a detected marking;
identify, based on the selected marking's position-identifying data, a set of acceptable responses;
compare the selected marking to the set of acceptable responses;
determine that the selected marking does not match any of the acceptable responses in the set; and
provide the user with a prompt to correct the selected marking.

4. The system of claim 1, wherein the program instructions also instruct the pen to:
select a detected marking;
identify, based on the selected marking's position-identifying data, a set of time-dependent acceptable responses;
compare the selected marking to the set of time-dependent acceptable responses;
determine that the selected marking does not match any of the time-dependent acceptable responses in the set; and
provide the user with a prompt to correct the selected marking.

5. The system of claim 1, further comprising:
a document production resource;
wherein at least a portion of the handwritten markings are positioned in one or more of the worksheet's input fields; and
at least a portion of the handwritten markings in the fields correspond to workflow data, wherein the workflow data is for the document production resource or for a print job that is processed by the document production resource.

6. The system of claim 1, wherein the memory also has instructions that instruct the processor to:

analyze data corresponding to the handwritten markings and process parameters; and provide a recommendation to alter a process workflow.

7. The system of claim 5, wherein the memory also has instructions that instruct the processor to:

analyze data corresponding to the handwritten markings and process parameters to identify a utilization measure for the document production resource;

determine that the utilization measure is at or below a threshold; and provide a recommendation to alter a process workflow for the document production resource.

8. A system for capturing process workflow information, comprising:

a computing device having a processor, a memory and a graphical user interface, the memory having program instructions that instruct the processor to:

receive, from a user, process workflow information that includes an identifier corresponding to a production process resource and at least one observable process parameter for the resource, generate a template file comprising the process workflow information and position-identifying data, and print a worksheet on a substrate based on the template file, wherein the worksheet includes the position-identifying data and one or more input fields; and a digital pen comprising an image-capturing sensor and an ink tip, wherein the digital pen includes program instructions that instruct the pen to:

detect a plurality of handwritten markings on the substrate, wherein the markings comprise ink from the ink tip; and detect, via the image-capturing sensor, at least a portion of the position-identifying data, wherein each item of detected position-identifying data corresponds to a location of one of the handwritten markings on the substrate.

9. The system of claim 8, wherein the digital pen includes a memory, and the program instructions for the digital pen further instruct the pen to:

save the detected handwritten markings and the detected position-identifying data in a worksheet file.

10. The system of claim 8, wherein the digital pen further comprises a timing circuit, and the program instructions for the digital pen further instruct the pen to:

identify, for each detected handwritten marking, a time stamp; and save each of the time stamps in the worksheet file in association with the time stamp's corresponding marking.

11. The system of claim 8, wherein the program instructions for the digital pen further instruct the pen to:

select a detected handwritten marking;

identify, based on the selected marking's position-identifying data, a set of acceptable responses;

compare the selected marking to the set of acceptable responses;

determine that the selected marking does not match any of the acceptable responses in the set; and provide the user with a prompt to correct the selected marking.

12. The system of claim 8, wherein the program instructions for the digital pen further instruct the pen to:

select a detected handwritten marking;

identify, based on the selected marking's position-identifying information, a set of time-dependent acceptable responses;

compare the selected marking to the set of time-dependent acceptable responses;

determine that the selected handwritten marking does not match any of the time-dependent acceptable responses in the set; and provide the user with a prompt to correct the selected handwritten marking.

13. The system of claim 8, further comprising program instructions for the digital pen that further instruct a processor to:

identify an input location that corresponds to the captured markings, the input location being that for which the applicable input field has a physical position that corresponds to the position-identifying data;

identify a process parameter that corresponds to the applicable input field; and store, in the worksheet file in association with applicable input field, the identified process parameter.

14. The system of claim 8, further comprising program instructions that instruct a processor to:

compare the saved markings and process parameters with anticipated process parameter values to yield a result; and prepare a report of the result.

15. The system of claim 8, further comprising:

a document production resource;

wherein the substrate includes a plurality of input fields that correspond to one or more categories of workflow data for the document production resource, and at least a portion of the handwritten markings on the substrate are positioned in one or more of the input fields; and at least a portion of the handwritten markings in the fields correspond to workflow data, wherein the workflow data is for the document production resource or for a print job that is processed by the document production resource.

16. The system of claim 8, further comprising program instructions that instruct a processor to:

analyze data corresponding to the handwritten markings and process parameters; and provide a recommendation to alter a process workflow.

17. The system of claim 15, further comprising program instructions that instruct a processor to:

analyze data corresponding to the handwritten markings and process parameters to identify a utilization measure for the document production resource;

determine that the utilization measure is at or below a threshold; and provide a recommendation to alter a process workflow for the document production resource.

18. A method for capturing process workflow information, comprising:

receiving, by a computing device, from a user, process workflow information that includes an identifier corresponding to a document production resource and at least one observable process parameter for the resource;

generating a template file comprising the process workflow information and position-identifying data;

printing a worksheet on a substrate based on the template file, wherein the worksheet includes the position-identifying data and one or more input fields that correspond to one or more categories of workflow information for the document production resource;

receiving, from a digital pen, a set of captured handwritten markings and position-identifying data that the digital pen detected on the substrate wherein each item of detected position-identifying data corresponds to a location of one of the handwritten markings on the substrate;

identifying an input location that corresponds to each of the captured markings, each input location being that for which the applicable input field has a physical position that corresponds to the position-identifying data;

identifying a process parameter that corresponds to each applicable input field; and storing, in a worksheet file in association with each applicable input field, the field's identified process parameter.

19. The method of claim 18, further comprising:

selecting a detected handwritten marking;

identifying, based on the selected marking's position-identifying data, a set of acceptable responses;

comparing the selected marking to the set of acceptable responses;

determining that the selected marking does not match any of the acceptable responses in the set; and causing the digital pen to prompt a user to correct the selected marking.

20. The method of claim 18, further comprising:

analyzing, by a processor, data corresponding to the handwritten markings and process parameters; and generating a recommendation to alter a process workflow for the document production resource.

* * * * *